United States Patent [19]

Grasmeder et al.

[11] Patent Number: 5,585,420

[45] Date of Patent: Dec. 17, 1996

[54] METHOD OF PRODUCING SCRATCH RESISTANT POLYMER COMPOSITIONS

[75] Inventors: John R. Grasmeder; Christopher I. Lindsay, both of Cleveland, United Kingdom

[73] Assignee: BASF Aktiengesellschaft, Ludwigshafen, Germany

[21] Appl. No.: 492,005

[22] PCT Filed: Jan. 29, 1994

[86] PCT No.: PCT/GB94/00148

§ 371 Date: Jul. 19, 1995

§ 102(e) Date: Jul. 19, 1995

[87] PCT Pub. No.: WO94/18267

PCT Pub. Date: Aug. 18, 1994

[30] Foreign Application Priority Data

Feb. 3, 1993 [GB] United Kingdom .................. 9302069

[51] Int. Cl.$^6$ ............... C08L 63/00; C08L 23/00; C08K 3/34

[52] U.S. Cl. .............. 523/400; 524/114; 524/210; 524/267; 524/515; 524/451; 525/240

[58] Field of Search ................... 524/451, 515, 524/114, 261, 267, 226, 481; 525/240; 523/400

[56] References Cited

U.S. PATENT DOCUMENTS

| | | | |
|---|---|---|---|
| Re. 31,213 | 4/1983 | Brachman | 428/462 |
| 4,010,127 | 3/1977 | Taka et al. | 260/23 R |
| 4,234,469 | 11/1980 | Ohta et al. | 260/42.46 |
| 4,837,275 | 6/1989 | Chu | 525/104 |
| 5,077,328 | 12/1991 | Haruna et al. | 524/100 |
| 5,082,889 | 1/1992 | Koizumi et al. | 524/457 |

FOREIGN PATENT DOCUMENTS

| | | |
|---|---|---|
| 0235956 | 9/1987 | European Pat. Off. . |
| 0426315 | 5/1991 | European Pat. Off. . |
| 0476926 | 3/1992 | European Pat. Off. . |
| 93/03095 | 2/1993 | WIPO . |

*Primary Examiner*—Tae Yoon
*Attorney, Agent, or Firm*—Keil & Weinkauf

[57] ABSTRACT

Filled polymer compositions having improved scratch resistance comprise as a major component a polymer resin blend itself comprising 70 to 95% polypropylene homopolymer, and 5 to 30% low density polyethylene, particularly lldpe or vldpe; and 5 to 30% plate like inorganic filler. Optional components include high rubber ethylene-propylene copolymers, fatty acid amides, polyorganosiloxanes and epoxy resins as well as pigments, antioxidants etc. The compositions are formed by mixing the plate like filler and the epoxy resin prior to mixing with another component of the composition which is significantly absorbed by the plate like filler, and subsequently mixing the components of the composition in the melt phase, particularly in a twin screw extruded, and extruding the composition. The compositions find use in vehicle interior trim components, which particularly include polyorganosiloxane, and domestic appliance components, particularly housings, which particularly include high rubber ethylene-propylene copolymer.

11 Claims, No Drawings

METHOD OF PRODUCING SCRATCH RESISTANT POLYMER COMPOSITIONS

This invention relates to scratch resistant polymer compositions and moulded articles made using such compositions. In particular it relates to such pigmented compositions and articles having aesthetic appeal for example vehicle interior trim components and domestic appliance components, particularly housings.

Plastics materials are used in many applications where aesthetic appearance is important. Indeed, the commercial success of such articles may depend on their aesthetic appeal. In addition, such articles should also possess suitable functional properties.

To maintain a good appearance, it is desirable that plastic articles have good scratch resistance and do not optically stress whiten to any significant extent when scratched. Stress whitening of pigmented plastic articles is aesthetically undesirable because the white marks formed on scratching visually contrast with the colour of the article. This is particularly marked if the plastics article is darkly pigmented for example black, grey, brown or blue, as are commonly used in vehicle interior trim.

Our PCT Application No PCT/GB 92/01400, (published as WO 93/03095 A) (which is incorporated by reference herein) relates to a polypropylene copolymer composition and to articles made from it having improved scratch resistance and including a polyorganosiloxane, particularly a polydimethylsiloxane. This prior development provides an improvement in scratch resistance over conventional compounded polypropylene type materials, but further improvements would be very attractive for industrial uses of compounded polyolefin materials.

The present invention is directed to a filled compounded blend of mainly polypropylene and a minor proportion of low density polyethylene type polymers, in which the filler is mainly a plate like filler such as talc. The filled compounded blend has excellent scratch resistance, retains a desirable combination of impact strength and stiffness and may be produced economically.

Accordingly the present invention provides a filled polymer composition which comprises:
as a major component a polymer resin blend itself comprising:
from 70 to 95% by weight of a polypropylene homopolymer, and
from 5 to 30% by weight of a low density polyethylene;
and from 5 to 30% by weight of a plate like inorganic filler.

The compositions of the invention can give significantly improved resistance to stress whitening and can be used to produce moulded articles with surfaces having improved scratch resistance. Accordingly, a further aspect of the invention provides for the use of a polymer composition according to the invention as a scratch resistant material.

The polypropylene homopolymer used in the polymer resin blend is a conventional substantially isotactic polypropylene. Typically it will have a MFI of from 2 to 50, more usually 4 to 40 and commonly 5 to 20, dg.min$^{-1}$ (at 230° C., 2.16 kg load). As is described in more detail below, within the invention there are compositions having differing relative levels of filler. We have found that within the overall MFI ranges different ranges are appropriate to such different filler levels as is set out below.

The low density polyethylene used in the polymer resin blend is a polyethylene having a density in the range about 0.890 to about 0.935. This range corresponds the polymers commonly described as Low Density PolyEthylene (LDPE) and Very Low Density PolyEthylene (VLDPE). Among LDPE polymers, so-called Linear Low Density PolyEthylene (LLDPE) polymers are particularly useful. The MFI of the low density polyethylene polymer is typically from 2 to 40, more usually from 4 to 35 and most commonly from 15 to 25, dg.min$^{-1}$ (at 190° C., 2.16 kg load).

Considered as a two component blend, the polypropylene and low density polyethylene are used in relative proportions within the range about 70 to about 95% by weight polypropylene and about 30 to about 5 by weight polyethylene, more usually 80 to 90% polypropylene and 20 to 10% polyethylene and most commonly about 85% polypropylene and polyethylene.

The "plate like filler" is a filler whose particles have a length and width substantially greater than their depth. The presence of a plate like inorganic filler in the composition of the invention gives the composition enhanced stiffness. Suitable plate like inorganic fillers include mineral fillers such as clays, mica and especially talc. Particularly useful talcs include Luzenac 15M00 and 20M00S (Talc de Luzenac) and Finntalc M03 from Finnminerals Oy. Although clays have plate like particles and can be used in the invention, their use alone in not especially desirable. The composition can include mixtures of plate like fillers and/or other, non plate like, fillers such as chalk, for example Polycarb SB ground chalk filler form ECC International, or milled glass fibre, for example Vetrotex 1320 unsized milled glass fibre from Vetrotex. The filler desirably has an mean particle size (measured as spheres of equal diameter) of from 1 to 20 µm. With anisotropic fillers such as the plate like filler the maximum dimensions of individual filler particles will generally be significantly larger than the mean.

The amount of plate like filler used is suitably from about 5 to about 30% by weight of the composition. In general, the filler level in vehicle interior trim applications is typically in the range 14 to 30%, particularly 16 to 25, and especially about 18 to 22%, by weight of the composition. At these filler levels the polypropylene used is desirably one having a MFI of typically from 10 to 50, more usually from 10 to 40 and most commonly 10 to 25, dg.min$^{-1}$.

The filler level in domestic appliance applications, particularly housings for domestic appliances, is typically from 5 to 15%, particularly 7 to 12%, especially about 10%, by weight. At these filler levels the polypropylene used is desirably one having a MFI of typically from 2 to 15, more usually from 4 to 15 and most commonly 5 to 15, dg.min$^{-1}$.

Usually the filler will be mostly or wholly the plate like filler, but other fillers can be included. Usually, when non plate like fillers are included the amount will be up to about 5 weight % of the composition. The inclusion of such other fillers may have a deleterious effect on some properties. However, for vehicle interior trim applications, we have found that a particularly useful filler combination is talc 19 to 25% and chalk 1 to 3 weight % of the composition.

Compositions of the three components have good scratch resistance, but we have found that even better results can be obtained by also including a polyorganosiloxane in the composition. When used the polyorganosiloxane is of a type and is used in amounts broadly similar to those set out in PCT/GB 92/01400 referred to above. For full details of the use of polyorganosiloxanes, reference is directed to that specification. However, the polyorganosiloxane is typically a polydialkylsiloxane, and particularly a polydimethylsiloxane. To get good compatibility with the polymer composition, the viscosity of the polyorganosiloxane will typically be from 13000 to 50000, particularly 25000 to 35000, and optimally about 30000, cSt at 25° C. Such polyorganosiloxanes typically have molecular weights up to 95 kD, particularly 65 kD to 90 kD especially 80 kD to 88 kD for example 85 kD. Generally, compatibility is best when relatively viscous polyorganosiloxanes are used with resin polymers having low MFI and relatively fluid polyorganosiloxanes are used with resin polymers having high MFI. The polyorganosiloxanes can be provided to the polymer composition as the siloxane itself (usually an oily liquid) or as a masterbatch for example in polypropylene. Examples of suitable polyorganosiloxanes include Nourimix SI-702 (a 30% polyorganosiloxane masterbatch in polypropylene) (Akzo) or Rhodorsil 47V/30000 (Rhone-Poulenc).

When used in the polymer composition of this invention, the amount of polyorganosiloxane will usually be at least 0.5% by weight based on the overall composition. The use of less gives little benefit in improving scratch resistance. The performance of the compositions improves with increasing polyorganosiloxane amount up to about 2 weight % of the composition. Amounts larger than about 2.5 weight % offer little further benefit and it is unlikely that amounts greater that about 5 weight % will be used because of the cost of the polyorganosiloxane and such large amounts may have an adverse effect on the mechanical properties of the composition. We have obtained best results using from 1.5 to 2 and particularly about 1.5 weight % of polyorganosiloxane. The use of a polyorganosiloxane is particularly applicable to compositions containing relatively high levels of plate like filler, such as those discussed above for vehicle trim applications. For domestic appliance applications, a polyorganosiloxane can be included, but may have an adverse effect on gloss and the improvement in scratch resistance is less significant in a practical sense.

Rather surprisingly, we have found that the inclusion of high rubber polypropylene ethylene copolymers can have useful effects in compositions of the invention. These polymers are, in effect, blends of ethylene propylene rubber and isotactic polypropylene. The expected effect of including such materials would be an increase in toughness and a sharp increase in susceptibility to stress whitening and thus a reduction in scratch resistance. Although we have observed the increase in toughness, the stress whitening is increased less than would have been expected. Further, at relatively low filler levels, the inclusion of high rubber polypropylene ethylene copolymers appears to give an increase in the gloss of moulded products. This is unexpected and is beneficial in making products more attractive to the consumer, particularly for domestic appliances. At higher filler levels, as are typical for vehicle interior trim uses, the increase in gloss is much reduced and may not be observed at all. We cannot explain this, but it is particularly convenient that the demand in such materials is for relatively low gloss levels.

When used the high rubber polypropylene ethylene copolymers will typically comprise from 5 to 40%, particularly 10 to 28%, especially 11 to 16% by weight as such based on the combination of the polypropylene homopolymer, polyethylene and high rubber polypropylene ethylene copolymers. The rubber levels in the copolymers is typically from 12 to 50%, particularly 20 to 45, and especially about 43% by weight on the copolymer. The rubber and addition levels will usually be chosen to give about 2 to about 15%, particularly 5 to 8%, by weight ethylene propylene rubber based on the total polymer.

In calculating the overall proportions of polypropylene and polyethylene, the polypropylene in the high rubber polypropylene ethylene copolymer should be included in the calculation. In other words it is clearer to express the addition of the high rubber polypropylene ethylene copolymer in terms of the ethylene propylene copolymer rubber included in the resin formulation.

Expected typical end uses for the compositions of the invention in moulded form include automotive interior trim components and domestic appliances. Almost invariably these are pigmented and, thus, the polymer compositions of the invention will ordinarily be pigmented. The amount of pigment in the composition will typically be from 0.1 to about 7, most usually 0.3 to 2.5 weight % of the composition, depending on the pigment used and the colour and tone required. Suitable pigments may be organic and/or inorganic and include carbon black, titanium dioxide, iron oxide and copper phthalocyanine.

Conventional additives such as anti-oxidants, antioxidant synergists, neutralising agents, lubricants, ultra violet light stabilisers and mould release agents can be included in the composition. Examples of such additives include, as antioxidants hindered phenols such as Irganox 1010 (Ciba Geigy), typically in an amount of 0.05 to 0.7% especially 0.1 to 0.2%; as antioxidant thioester synergists dilaurylthiodipropionate and distearylthiodipropionate in an amount of 0.05 to 1%; as neutralising or antacid agents, materials such as aluminiummagnesium hydroxy stearate, typically in an amount of 0.05 to 0.8%; as lubricants, metal, for example zinc and calcium, stearates, which may also act as antacids; and as ultra violet light stabilisers, hindered amine stabilisers such as Tinuvin 770DF (Hoechst) or Chimassorb 944 (Ciba Geigy) typically in an amount of about 0.8% (all percentages being by weight based on the composition).

Fatty acid amides are commonly used as mould release agents and can be used as such in the composition. However, we have found that the combination of polyorganosiloxane and fatty acid amide gives especially good effect on scratch resistance. The effect seems to be synergistic and we do not know why it is so beneficial.

Accordingly, a further aspect of the invention provides a filled polymer composition which comprises:
as a major component a polymer resin blend itself comprising:
from 70 to 95% by weight of a polypropylene homopolymer, and from 5 to 30% by weight of a low density polyethylene; from 5 to 30% by weight of a plate like inorganic filler; and a fatty acid amide.

The effect of including a fatty acid antide component is to enhance further the improvement in scratch resistance. Suitable fatty acid amides are of fatty acids with C10 to C25, especially C16 to C22, carbon chains. A particularly suitable fatty acid amide is erucamide, available as Crodamide E (Croda Chemicals). The amount of fatty acid amide will usually be up to 1 weight % of the composition, particularly 0.1 to 0.8%, and especially about 0.5% by weight of the composition.

The plate like inorganic filler may tend to absorb certain components in the polymer composition on forming the composition. In particular talc tends to abstract antioxidants from the polymer composition thus requiring an increased amount of antioxidant to be used. In this invention, we have additionally found that the plate like filler can absorb polyorganosiloxane when present. To counteract these effects, it is generally desirable to use a plate like filler that has been passivated. Various ways of passivating fillers have been suggested, but we have found it particularly useful to passivate the filler by the inclusion of an epoxy resin. The use of epoxy resins can reduce both of these effects very considerably. The use of passivated plate like fillers forms a particular aspect of the invention, especially when the filler is passivated by the inclusion of an epoxy resin.

Thus, in a further aspect the invention provides a filled polymer composition which comprises:

as a major component, a polymer resin blend itself comprising:

from 70 to 95% by weight of a polypropylene homopolymer, and from 5 to 30% by weight of a low density polyethylene; and from 5 to 30% by weight of a plate like inorganic filler; and an epoxy resin.

Desirably the composition also includes a fatty acid amide as described above and, accordingly, the invention further includes a filled polymer composition which comprises, as a major component, a polymer resin blend itself comprising:

from 70 to 95% by weight of a polypropylene homopolymer, and from 5 to 30% by weight of a low density polyethylene; and from 5 to 30% by weight of a plate like inorganic filler; a fatty acid amide; and an epoxy resin.

When used, the epoxy resin is typically present in the polymer composition in an amount of from 0.1 to 2% by weight. Larger amounts do not provide any further improvement in the properties of the polymer composition. Most desirably the epoxy resin is present in an amount of 0.1 to 1.5 weight % and optimally about 0.4 to 1 weight %.

Suitably, the components of a polymer composition according to the invention intended for vehicle interior trim applications are: the resin blend of polypropylene homopolymer and low density polyethylene is present in the composition in an amount of 70 to 86, particularly 75 to 85% by weight, within the resin blend the proportion of polypropylene is typically 70 to 95%, particularly about 85%, by weight of a polypropylene polymer having an MFI of from 4 to 40, and the proportion of low density polyethylene is from 5 to 30%, particularly about 15%, by weight of low density polyethylene having an MFI of from 4 to 35;

filler:

14 to 30 and particularly 16 to 25, especially 18 to 22 weight %, particularly of talc;

polyorganosiloxane:

0.5% to 2.5% and especially not exceeding about 2% and particularly about 1.5 weight %, especially of a polyorganosiloxane having a viscosity of about 30000 cSt;

fatty acid amide:

0.1 to 0.8% particularly about 0.5%;

epoxy resin:

0.1 to 1.5% and particularly 0.4 to 1%.

other additional components may be present particularly in the amounts as disclosed above.

Suitably, the components of a polymer composition according to the invention intended for domestic appliance applications are: the resin blend of polypropylene homopolymer and low density polyethylene is present in the composition in an amount of 85 to 95, particularly 88 to 93 and desirably about 90% by weight, within the resin blend the proportion of polypropylene is typically 70 to 95%, particularly about 85%, by weight of a polypropylene polymer having an MFI of from 4 to 15, and the proportion of low density polyethylene is from 5 to 30%, particularly about 15%, by weight of low density polyethylene having an MFI of from 4 to 35;

optionally but desirably:

high rubber polypropylene ethylene copolymer in an amount to supply from about 2 to about 15%, particularly 5 to 8%, by weight ethylene propylene rubber based on the total polymer, particularly as high rubber polypropylene ethylene copolymer containing 12 to 50%, particularly 20 to 45, and especially about 43%, of ethylene propylene rubber by weight on the copolymer;

filler:

5 to 15 and particularly 7 to 12, especially about 10, weight %, particularly of talc;

fatty acid amide:

0.1 to 0.8% particularly about 0.5%;

epoxy resin: 0.1 to 1.5% and particularly 0.4 to 1%.

other additional components may be present particularly in the amounts as disclosed above.

The compositions of the invention can be made by mixing the components of the composition. Initial formulation can be in a 'dry' mixer, usually with the polyorganosiloxane being added as the last component, but full compounding will usually include melt phase processing typically under high shear as in a twin screw extruder. Thus, the invention includes a method of making a composition of the invention by mixing the components of the composition in the melt phase, particularly in a twin screw extruder, and extruding the composition.

When used, an epoxy resin is included in the composition to passivate the plate like filler towards additives such as antioxidants and towards a polyorganosiloxane, when used. The effectiveness of the epoxy resin in passivating the plate like filler towards the polyorganosiloxane is severely reduced unless the filler is treated with the epoxy resin before contact with the polyorganosiloxane. We think that as the polyorganosiloxane is liquid it is available to interact with the filler immediately on contact and passivation should be done before such contact. Passivation towards antioxidants and similar materials does not need this precaution because epoxy resins are either liquid or relatively low melting solids which readily melt in melt processing and as liquids will passivate the filler before the antioxidants melt.

Accordingly, the invention additionally provides a method of producing a filled polymer composition which comprises:

as a major component a polymer resin blend itself comprising:

from 70 to 95% by weight of a polypropylene homopolymer, and from 5 to 30% by weight of a low density polyethylene;

from 15 to 30% by weight of a plate like inorganic filler;

at least 0.5% by weight of the polymer resin blend of a polyorganosiloxane; and an epoxy resin, which method comprises mixing the plate like filler and the epoxy resin prior to mixing with another component of the composition which is significantly absorbed by the plate like filler, in particular a polyorganosiloxane and/or an antioxidant, and subsequently mixing the components of the composition in the melt phase, particularly in a twin screw extruder, and extruding the composition.

For compositions of the invention containing a polyorganosiloxane, a convenient and advantageous practical way of including the polyorganosiloxane in the composition is to formulate the composition not including the polyorganosiloxane up to and including part of melt phase processing, particularly in a twin screw extruder or similar high shear melt phase processor, and to add the polyorganosiloxane to the composition during such melt phase processing, for example by adding it through a port in the barrel of the extruder, and subsequently continuing melt phase processing to thoroughly mix the polyorganosiloxane into the formulation.

The polymer composition of the invention can conveniently be formed into articles such as vehicle interior trim components or domestic appliance components, particularly housings, by injection moulding. Other production techniques can be used as appropriate. The invention includes moulded and fabricated components made from the polymer composition of the invention.

The invention is illustrated by the following examples. All parts and percentages are by weight based on the total composition unless otherwise indicated.

Materials

Polymers

Polypropylene homopolymer—(PP) the polymers used were standard production isotactic polypropylene polymers (ICI Chemicals & Polymers Ltd). Four polymers of different MFI values (measured at 230° C., 2.16 kg load) were used:

| | |
|---|---|
| PP-A | MFI 3.7 |
| PP-B | MFI 6 |
| PP-C | MFI 13 |
| PP-D | MPI 34 |

Low Density Polyethylene (PE) the following polymers of differing densities and MFI values (measured at 190° C., 2.16 kg load) were used:

i PE-A: Very Low Density Polyethylene: density 0.895, MFI 22.

ii PE-B: Very Low Density Polyethylene: density 0.895, MFI 4.6.

iii PE-C: Very Low Density Polyethylene: density 0.900, MFI 1.1.

iv PE-D: Linear Low Density Polyethylene: density 0.920, MFI 4.6.

Ethylene Propylene Rubber (EPR) Novolen 2900 NCX (BASF) a high rubber ethylene propylene copolymer containing 43% by weight rubber (about 22% by weight ethylene), MFI 10 (measured at 230° C., 2.16 kg load). (NB in calculating the total amount of polypropylene in the mix with EPR present the PP in the EPR is included.)

Polypropylene Copolymer (co-PP) commercially available medium impact propylene ethylene copolymer (about 12% rubber phase—about 6% ethylene residues), MFI 13 (measured at 230° C., 2.16 kg load).

Fillers

Luzenac 20 M00S (mean particle size ca 8 μm) and Luzenac Steamic 00S (mean particle size ca 5 μm) are high quality talcs (Talc de Luzenac).

Finntalc M03 high quality talc mean particle size ca 2 μm (Finnminerals Oy).

Polyorganosiloxane

PDMS—is Rhodorsil 47V/30000 (Rhone Poulenc)—a polydimethylsiloxane viscosity 30000 cSt (±10%) and average molecular weight 85 kD which was added as an oil.

Additives

Irganox 1010—hindered phenol antioxidant (Ciba Geigy).

Tinuvin 770—hindered amine light stabiliser (Hoechst).

Chimassorb 944—hindered amine light stabiliser (Ciba Gigy).

DSTDP—distearylthiodipropionate, a thioester antioxidant synergist.

Hostanox 03—hindered phenol antioxidant (Hoechst).

Hostanox SE 10—non thioester antioxidant synergist (Hoechst).

Crodamide E—erucamide fatty acid amide (Croda Chemicals).

Araldite—epoxy resin, liquid or solid resins were used (Ciba Geigy).

Pigment—a mixture of carbon black and titanium dioxide to give a grey colour. Differing shades were used including Medium Grey and Dark Grey—a near black pigment formulation including blue pigment to give a neutral tone in the product.

Test methods

Scratch resistance (SR) Two tests were used:

1 Sets of scratches were made on moulded test plaques of the polymer compositions using a hand operated scratch tester (No 706 from Sheen Instruments Ltd. of Teddington, England). Applied forces in the range 0.5 to 15N and a 1 mm hemispherical stylus were used. The scratches were visually assessed by a set of independent observers and the test plaques ranked according to the visibility of the scratches (1 indicating the least visible scratches). For Examples 1 and 4 four and for Example 3 five observers were used. The rankings of the observers were averaged to give a mean ranking score (Mean Rank—TR) and the difference between the maximum and minimum rank for each sample was also noted as the range (Rg) as an indication of consistency between the observers and the distinctness of the ranking scores. (This test is based on BS3900-E2).

For some samples a series of 10 lines was scratched as described above using applied forces of 0.5, 0.7, 1, 2, 3, 5, 7, 10, 12 and 15N. The scratches were examined to assess the number of lines of stress whitening were visible. The result is given as the No of Lines (Lin).

Specular gloss (SG - %)—was measured at 60° of the smooth side of moulded test plaques according to ASTM DS23 - 85.

Tensile yield stress (TYS - MPa)—was measured according to ISO 527, with a rate of application of force of 50 mm/min.

Flexural Modulus (FM - GPa)—was measured according to ISO 178, with a rate of application of force of 10 mm/min.

Melt Flow Index (MFI - $dg.min^{-1}$)—was measured according to ISO 1133 at 190° C., for the unfilled polyethylene polymers, and at 230° C., for the unfilled polypropylene polymers and formulated mixes, using a 2.16 kg load.

Notched Izod (Izod - $kJm^{-2}$)—was measured according to ISO 180 at the temperatures stated with a machined notch radius of 0.25 mm.

Heat Distortion Temperature (HDT °C.)—was measured according ISO 75 at applied forces of 0.45 and 1.8 MPa—the mean of the two readings at each temperature is given.

EXAMPLE 1

A series of filled polymer formulations was made up and tested. The materials produced were formulated as similar to vehicle interior trim materials. The raw materials of the formulations used are set out in Table 1 below. Amounts of the materials used are given as parts by weight (pbw). The formulations were made up by thoroughly dry blending the components and then melt processing in a twin screw extruder and cooling and chopping the lace to give pellets.

The polypropylenes used were PP-B and PP-C (MFI's given); the polyethylene was PE-A; the filler used was talc 20 M00S and the following additive mix (Add) was used in each run:

| Material | pbw | |
|---|---|---|
| Irganox 1010 | 0.25 | |
| Tinuvin 770 | 0.50 | |
| Crodamide E | 0.25 | |
| Epoxy resin (solid) | 0.50 | |
| Zinc stearate | 0.16 | |
| Dark grey pigment mix | 0.67 | Total 2.33 |

Run 1 was a control run using a medium impact polypropylene copolymer (co-PP) instead of the blend of polypropylene and polyethylene used in the runs of the invention. This control is broadly comparable with currently commercially available polypropylene copolymer formulations intended for vehicle interior trim and similar applications. In Runs 2, 3, 4, 5 and 9 the polypropylene and polyethylene were blended in an extruder and pelleted before use in the formulation (i.e. the polymers overall had two passes of melt processing). In run 5 a liquid epoxy resin was used and the additive mix was added to and thoroughly dry blended with the polymer and filler components before the PDMS was added. In run 20 a high rubber EPR copolymer was included to improve the toughness.

Test samples were injection moulded using the pellets. The results of testing are set out in Table 5 below. Runs 2 to 4 illustrate the effect of increasing filler content. At lower or comparable filler contents, the runs of the invention are clearly superior to the control. Run 4 using 30% filler shows but marginally poorer scratch resistance than the control at 20% filler. Run 5 includes PDMS and shows a further increase in scratch resistance. Runs 2 to 6 use a MFI 6 and Runs 7 to 10 a MFI 13 polypropylene. The results indicate no significant difference between the two pass melt processed and single pass materials. Run 10 indicates that the toughness can be improved whilst sacrificing a little on scratch resistance.

TABLE 1

| Run No | Ex No | PP MFI | PP pbw | PE pbw | Talc pbw | Add pbw | Other pbw | Material |
|---|---|---|---|---|---|---|---|---|
| 1 | C1 | 13 | 77.67 | — | 20 | 2.33 | | PP is co-PP |
| 2 | 1 | 6 | 70.27 | 12.40 | 15 | 2.33 | | |
| 3 | 1 | 6 | 66.02 | 11.65 | 20 | 2.33 | | |
| 4 | 1 | 6 | 57.52 | 10.15 | 30 | 2.33 | | |
| 5 | 1 | 6 | 64.32 | 11.35 | 20 | 2.33 | 2.0 | PDMS |
| 6 | 1 | 6 | 66.02 | 11.65 | 20 | 2.33 | | |
| 7 | 1 | 13 | 66.02 | 11.65 | 20 | 2.33 | | |
| 8 | 1 | 13 | 58.52 | 19.42 | 20 | 2.33 | | |
| 9 | 1 | 13 | 66.02 | 11.65 | 20 | 2.33 | | |
| 10 | 1 | 13 | 55.12 | 10.90 | 20 | 2.33 | 11.65 | EPR |

EXAMPLE 2

A comparison was run between a PDMS containing formulation as described in our PCT Application No PCT/GB 92/01400 (published as WO 93/ . . . A), Run 11, and a formulation of this invention, Run 12, containing no PDMS and made using PP-B and PE-A. The raw materials of the formulations are set out in Table 2 below. The formulations were made up as described in Example 1 (in the Control the epoxy resin was added to the mix and dry blended in before the PDMS was added).

TABLE 2

| | Amount (pbw) | |
|---|---|---|
| Material | Run 11 (C2) | Run 12 |
| co-PP MFI 13 | 73.97 | — |
| PP-B MFI 6 | — | 64.15 |
| PE-A MFI 13 | — | 11.32 |
| Talc 20 MOOS | 22 | 22 |
| PDMS | 2.0 | — |
| Epoxy resin (liquid) | 0.5 | 0.5 |
| Irganox 1010 | 0.1 | 0.1 |
| DSTDP | 0.1 | 0.1 |
| Tinuvin 770 | 0.5 | 0.5 |
| Crodamide E | 0.5 | 0.5 |
| Zinc stearate | 0.16 | 0.16 |
| Dark grey pigment mix | 0.67 | 0.67 |

Test samples were injection moulded using the pellets from extrusion mixing. Scratch resistance testing showed that the Run 2 formulation was consistently superior to that of the Run 1 control, particularly at loads above about 5N. The results of physical testing these two formulations are included in Table 5 below. These results indicate that the formulation of this invention has better resistance to stress whitening than the control.

EXAMPLE 3

A further series of filled polymer formulations was made up and tested. The materials produced were formulated as similar to domestic appliance materials, particularly to have high gloss. The formulations used are set out in Table 3 below. In the Example Runs (14 to 17) PP-C and PE-A, talc Finntalc M03, medium grey pigment mix (1 part per hundred of total composition) and the following Additive mix were used:

| Material | pbw | |
|---|---|---|
| Hostanox OB | 0.12 | |
| Hostanox SE 10 | 0.36 | |
| Epoxy resin (solid) | 0.50 | |
| Zinc stearate | 0.18 | |
| Crodamide E | 0.50 | Total 1.66 |

The formulations were made up by thoroughly dry blending the components and then melt processing in a twin screw extruder and cooling and chopping the lace to give pellets. The formulated polymer mix had a MFI of about 7 to 9.

TABLE 3

| Run No | Ex No | PP pbw | PE pbw | Talc pbw | Add pbw | Other pbw | Material |
|---|---|---|---|---|---|---|---|
| 13 | C3 | 88.34 | — | 10 | 1.66 | | PP is co-PP |
| 14 | 3 | 75.09 | 13.25 | 10 | 1.66 | | |
| 15 | 3 | 61.84 | 13.25 | 10 | 1.66 | 13.25 | EPR |
| 16 | 3 | 75.09 | 13.25 | 10 | 1.66 | | |
| 17 | 3 | 79.34 | 14.00 | 5 | 1.66 | | |

Test samples were injection moulded using the pellets. The results of testing are set out in Table 6 below.

EXAMPLE 4

A further series of filled polymer formulations was made up and tested. The materials produced were formulated with relatively high filler levels as similar to vehicle interior trim materials. The raw materials of the formulations are set out in Table 4 below. The filler used was talc 20 M00S and the following additive mix (Add) was used in each run:

| Material | pbw | |
|---|---|---|
| Irganox 1010 | 0.25 | |
| Tinuvin 770 | 0.50 | |
| Crodamide E | 0.25 | |
| Epoxy resin (solid) | 0.50 | |
| Zinc stearate | 0.16 | |
| Dark grey pigment mix | 0.67 | Total 2.33 |

The formulations were made up generally as described in Example 1 by dry blending followed by melt processing in an extruder. (NB the pigment quantity used was 0.67 parts per hundred of the remainder of the formulation.) In runs 18 and 24, 2.0% PDMS was included and the epoxy resin used was a liquid resin which was mixed with the other components before adding the PDMS. The formulation of Run 25 is a blend of equal parts of extruded pellets of Runs 23 and 7 to give a mix with an intermediate level (about 6% by weight) of the high rubber propylene ethylene copolymer. Run 26 is a Control sample of a commercially available medium impact copolymer containing 20% talc and a similar additive and pigment mix to the Runs of the invention.

TABLE 4

| Run No | Ex No | PP type | PP pbw | PE type | PE pbw | Talc pbw | Add pbw | Other pbw | Other Material |
|---|---|---|---|---|---|---|---|---|---|
| 18 | 4 | PP-C | 64.89 | PE-B | 11.45 | 20 | 2.33 | 2.0 | PDMS |
| 19 | 4 | PP-D | 66.59 | PE-B | 11.75 | 20 | 2.33 | | |
| 20 | 4 | PP-C | 66.59 | PE-A | 11.75 | 20 | 2.33 | | |
| 21 | 4 | PP-C | 66.59 | PE-D | 11.75 | 20 | 2.33 | | |
| 22 | 4 | PP-A | 66.59 | PE-C | 11.75 | 20 | 2.33 | | |
| 23 | 4 | PP-C | 39.17 | PE-B | 11.75 | 20 | 2.33 | 27.42 | EPR |
| 24 | 4 | PP-C | 73.21 | PE-B | 8.13 | 15 | 2.33 | 2.0 | PDMS |
| 25 | 4 | (see above) | | | | | | 13.71 | EPR (net) |
| 26 | C4 | co-PP | 77.67 | | | 20 | 2.33 | | |

Test samples were injection moulded using the pellets. The results of testing are set out in Table 6 below.

TABLE 5

| Run No | Ex No | MFI | TYS | FM | Izod 23° C. | Izod −40° C. | HDT 0.45 | HDT 1.8 | SG | SR MR | SR Rg | SR Lin |
|---|---|---|---|---|---|---|---|---|---|---|---|---|
| 1 | C1 | 12 | 27.2 | 2.5 | 3.3 | 2.3 | 110.0 | 67.0 | 24 | 9 | 0 | 9 |
| 2 | 1 | 9 | 28.5 | 1.9 | 4.3 | 2.1 | 103.6 | 57.8 | 49 | 3.75 | 1 | 5 |
| 3 | 1 | 9 | 28.3 | 2.2 | 3.9 | 2.1 | 107.4 | 63.7 | 41 | 3.75 | 1 | 6 |
| 4 | 1 | 9 | 27.6 | 2.9 | 3.1 | 1.8 | 110.3 | 63.4 | 18 | 10 | 0 | 8 |
| 5 | 1 | 8 | 25.5 | 2.1 | 4.9 | 2.3 | 106.0 | 60.9 | 18 | 1.25 | 1 | 4–5 |
| 6 | 1 | 10 | 28.4 | 2.2 | 3.4 | 2.3 | 110.2 | 59.9 | 34 | 7.25 | 1 | 7 |
| 7 | 1 | 13 | 29.2 | 2.5 | 3.0 | 1.9 | 111.0 | 64.6 | 33 | 5 | 2 | 6 |
| 8 | 1 | 14 | 25.6 | 1.9 | 3.2 | 2.0 | 100.7 | 56.5 | 33 | 3.5 | 2 | 5 |
| 9 | 1 | 14 | 28.7 | 2.3 | 2.9 | 1.8 | 109.1 | 63.4 | 32 | 7.75 | 1 | 7 |
| 10 | 1 | 12 | 26.3 | 2.1 | 3.9 | 2.1 | 104.5 | 58.5 | 36 | 5.5 | 1 | 7 |
| 11 | C2 | 13 | 23.5 | 2.7 | 3.9 | — | 111 | 62 | — | — | — | — |
| 12 | 2 | 9.6 | 26.1 | 2.5 | 3.3 | — | 109 | 59 | — | — | — | — |

TABLE 6

| Run No | Ex No | MFI | TYS | FM | Izod 23° C. | Izod 0° C. | HDT 0.45 | HDT 1.8 | SG | SR MR | SR Rg |
|---|---|---|---|---|---|---|---|---|---|---|---|
| 13 | C3 | 7 | 27.8 | 1.8 | 8.1 | 5.2 | 100.9 | 57.0 | 53 | 5 | 0 |
| 14 | 3 | 9.4 | 31.2 | 1.8 | 5.1 | 2.5 | 95.7 | 57.0 | 67 | 2.2 | 1 |
| 15 | 3 | 6.8 | 27.2 | 1.5 | 9.1 | 4.0 | 91.6 | 53.3 | 69 | 1 | 0 |
| 16 | 3 | 9.5 | 31.2 | 1.8 | 5.3 | 2.7 | 96.6 | 57.3 | 70 | 4 | 0 |
| 17 | 3 | 9.3 | 31.4 | 1.6 | 6.3 | 2.8 | 94.9 | 55.0 | 73 | 2.8 | 1 |
| 18 | 4 | 13 | 28.9 | 2.5 | 3.1 | 2.3 | 107.3 | 61.2 | 15 | 2.25 | 1 |
| 19 | 4 | 29 | 30.2 | 2.5 | 2.5 | 1.9 | 107.7 | 61.7 | 20 | 6.5 | 1 |
| 20 | 4 | — | 32.4 | 2.6 | 2.7 | 2.1 | 108.6 | 63.4 | 17 | 4.5 | 1 |
| 21 | 4 | — | 32.3 | 2.5 | 2.6 | 2.0 | 106.5 | 61.2 | 20 | 2.75 | 3 |
| 22 | 4 | 3.2 | 31.6 | 2.5 | 4.9 | 2.3 | 90.6 | 64.5 | 20 | 5.2 | 3 |
| 23 | 4 | 11 | 22.3 | 1.7 | 8.1 | 4.1 | 113.0 | 56.7 | 20 | 7.75 | 1 |
| 24 | 4 | — | 30.2 | 2.2 | 3.3 | 2.3 | 96.9 | 61.6 | 29 | 1 | 0 |

TABLE 6-continued

| Run No | Ex No | MFI | TYS | FM | Izod 23° C. | Izod 0° C. | HDT 0.45 | HDT 1.8 | SG | SR MR | SR Rg |
|---|---|---|---|---|---|---|---|---|---|---|---|
| 25 | 4 | — | 30.1 | 2.1 | 3.8 | 2.5 | 97.2 | 59.2 | 19 | 5 | 5 |
| 26 | C4 | 20 | 25 | 2.5 | 3.3 | — | 112 | 62 | 17 | 9 | 0 |

We claim:

1. A method of producing a filled polymer composition having as a major component a polymer resin blend of from 70 to 95% by weight of a polypropylene homopolymer, from 5 to 30% by weight of a low density polyethylene having a density in the range of about 0.89 to 0.935, from 5 to 30% by weight of talc;

at least 0.5% by weight of the polymer resin blend of a polyorganosiloxane; and an epoxy resin, which method comprises mixing the talc and the epoxy resin prior to mixing with another component of the composition which is significantly absorbed by the talc, mixing the epoxy resin with the talc prior to addition of the polyorganosiloxane and subsequently mixing the components of the composition in the melt phase and extruding the composition.

2. The method of claim 1, wherein the polypropylene homopolymer has a melt flow index of from 2 to 50 dg.min$^{-1}$ at 230° C., 2.16 kg load.

3. The method of claim 1 wherein the low density polyethylene is a linear low density polyethylene or a very low density polyethylene.

4. The method of claim 1 wherein the low density polyethylene has a melt flow index of from 2 to 40 dg.min$^{-1}$ at 190° C., 2.16 kg load.

5. The method of claim 1, wherein the relative proportions of polypropylene homopolymer and low density polyethylene are from 80 to 90% polypropylene and 20 to 10% polyethylene.

6. The method of claim 1, wherein the amount of talc is from 14 to 30% by weight of the composition and the polypropylene has a melt flow index of from 10 to 50 dg.min$^{-1}$ at 230° C., 2 16 kg load.

7. The method of claim 6, wherein the amount of polyorganosiloxane is from 0.5 to 2.5% by weight and the polyorganosiloxane having a viscosity of from 13000 to 50000 cSt at 25° C.

8. The method of claim 1, wherein the polymer composition additionally includes from 0.1 to 0.8% by weight of the total composition of a fatty acid amide.

9. The method of claim 1, wherein the polymer composition additionally includes one or more of:

from 0.1 to 7% of one or more pigments;

from 0.05 to 0.7% of one or more hindered phenol antioxidants;

from 0.05 to 1% of one or more antioxidant thioester synergists;

from 0.05 to 0.8% of one or more neutralizing or antacid agents, and/or about 0.8% of one or more ultra violet light stabilizers, all percentages by weight being based on the weight of the total composition.

10. The method of claim 1, wherein the amount of epoxy resin is from 0.5 to 2% by weight of the total composition.

11. The method of claim 1, wherein the amount of epoxy resin is from 0.4 to 1% by weight.

* * * * *